United States Patent
Eaton et al.

(10) Patent No.: US 6,989,357 B2
(45) Date of Patent: *Jan. 24, 2006

(54) ALCOHOL ABSORBED POLYALPHAOLEFIN DRAG REDUCING AGENTS

(76) Inventors: Gerald B. Eaton, 16222 Delozier, Houston, TX (US) 77040; Alan K. Ebert, 7723 Granlte Ridge La., Houston, TX (US) 77095

( * ) Notice: Subject to any disclaimer, the term of this patent is extended or adjusted under 35 U.S.C. 154(b) by 21 days.

This patent is subject to a terminal disclaimer.

(21) Appl. No.: 10/826,580

(22) Filed: Apr. 16, 2004

(65) Prior Publication Data

US 2004/0198619 A1  Oct. 7, 2004

Related U.S. Application Data

(63) Continuation-in-part of application No. 09/877,341, filed on Jun. 8, 2001.

(51) Int. Cl.
*C10M 105/04* (2006.01)
*C10M 129/06* (2006.01)

(52) U.S. Cl. ............ 508/575; 508/583; 508/591; 585/3; 585/10

(58) Field of Classification Search ........... 508/575
See application file for complete search history.

(56) References Cited

U.S. PATENT DOCUMENTS

| | | | | |
|---|---|---|---|---|
| 5,244,937 A | * | 9/1993 | Lee et al. | 523/204 |
| 5,449,732 A | * | 9/1995 | Smith et al. | 526/348.3 |
| 5,504,131 A | * | 4/1996 | Smith et al. | 524/401 |
| 5,504,132 A | * | 4/1996 | Smith et al. | 524/401 |
| 5,733,953 A | * | 3/1998 | Fairchild et al. | 523/336 |
| 6,015,779 A | * | 1/2000 | Eaton et al. | 508/591 |
| 6,162,773 A | * | 12/2000 | Eaton et al. | 508/591 |
| 6,172,151 B1 | * | 1/2001 | Johnston et al. | 524/379 |
| 6,242,395 B1 | * | 6/2001 | Eaton et al. | 508/591 |
| 6,730,750 B2 | * | 5/2004 | Eaton et al. | 526/90 |
| 6,730,752 B2 | * | 5/2004 | Eaton et al. | 526/124.3 |

* cited by examiner

*Primary Examiner*—Ellen M. McAvoy
(74) *Attorney, Agent, or Firm*—Andrews Kurth LLP; Anthony F. Matheny

(57) ABSTRACT

A composition including an alcohol absorbed polyalphaolefin that functions as a drag reducing agent and a process for the preparation of the drag reducing agent are disclosed. The process includes the steps of contacting alpha olefin monomers with at least one catalyst in a reactant mixture to form a polyalphaolefin. The polyalphaolefin is then contacted with at least one water insoluble alcohol for a period of time to provide an alcohol absorbed polyalphaolefin that is used as an improved drag reducing agent. Processes for reducing drag in a conduit are also disclosed.

20 Claims, No Drawings

ALCOHOL ABSORBED POLYALPHAOLEFIN DRAG REDUCING AGENTS

This application is a continuation-in-part of U.S. application Ser. No. 09/877,341, filed Jun. 8, 2001, pending.

BACKGROUND OF THE INVENTION

1. Field of the Invention

This invention relates to improved polyalphaolefins capable of improving flow of hydrocarbons through conduits, particularly pipelines, and in particular, polyalphaolefins that have absorbed one or more water insoluble alcohols. The invention also relates to methods for making improved drag reducing agents.

2. Description of Related Art

Generally speaking, the flow of liquid in a conduit, such as a pipeline, results in frictional energy losses. As a result of this energy loss, the pressure of the liquid in the conduit decreases along the conduit in the direction of the flow. For a conduit of fixed diameter, this pressure drop increases with increasing flow rate. When the flow in the conduit is turbulent (Reynold's number greater than about 2100), certain high molecular weight polymers can be added to the liquid flowing through the conduit to reduce the frictional energy losses and alter the relationship between pressure drop and flow rate. These polymers are sometimes referred to as drag reducing agents ("DRAs"), and they interact with the turbulent flow processes and reduce frictional pressure losses such that the pressure drop for a given flow rate is less, or the flow rate for a given pressure drop is greater. Because DRAs reduce frictional energy losses, increase in the flow capability of pipelines, hoses and other conduits in which liquids flow can be achieved. DRAs can also decrease the cost of pumping fluids, the cost of equipment used to pump fluids, and provide for the use of a smaller pipe diameter for a given flow capacity. Accordingly, an ongoing need exists to formulate improved drag reducing materials.

SUMMARY OF INVENTION

In accordance with the invention the foregoing advantages have been achieved through the present process for forming a drag reducing agent, the process comprising: contacting an alpha olefin monomer with at least one catalyst in a reactant mixture; polymerizing the alpha olefin monomer, wherein during the polymerization at least a portion of the alpha olefin monomer polymerize in the reactant mixture to provide an ultra-high molecular weight polyalphaolefin having a polyalphaolefin weight; and contacting the ultra-high molecular weight polyalphaolefin with at least one water insoluble alcohol for a period of time and at a temperature sufficient to form an alcohol absorbed polyalphaolefin having an alcohol absorbed polyalphaolefin weight that is at least 0.5% greater than the polyalphaolefin weight.

A further feature of the process is that the at least one alcohol maybe selected from the group consisting of 1-pentanol, 1-hexanol, 1-heptanol, n-octyl alcohol, n-nonyl alcohol, 1-decanol, and mixtures thereof. Another feature of the process is that the period of time may be at least one hour and the temperature may be at least 20° C. An additional feature of the process is that the period of time may be at least seven days and the temperature may be at least 20° C. Still another feature of the process is that the period of time may be at least twenty eight days and the temperature may be at least 20° C. A further feature of the process is that the at least one alcohol may be 1-pentanol. Another feature of the process is that the at least one alcohol may be 1-hexanol. An additional feature of the process is that the at least one alcohol may be 1-heptanol. Still another feature of the process is that the at least one alcohol may be n-octyl alcohol. A further feature of the process is that the at least one alcohol may be n-nonyl alcohol. Another feature of the process is that the at least one alcohol may be 1-decanol.

In accordance with the invention the foregoing advantages have been achieved through the present drag reducing agent comprising an alcohol absorbed polyalphaolefin, the alcohol absorbed polyalphaolefin including a polyalphaolefin having a polyalphaolefin weight and a water insoluble alcohol, wherein the alcohol absorbed polyalphaolefin includes an alcohol absorbed polyalphaolefin weight that is at least 0.5% greater than the polyalphaolefin weight.

A further feature of the drag reducing agent is that the at least one alcohol may be selected from the group consisting of 1-pentanol, 1-hexanol, 1-heptanol, n-octyl alcohol, n-nonyl alcohol, 1-decanol, and mixtures thereof. Another feature of the drag reducing agent is that the at least one alcohol may be 1-pentanol. An additional feature of the drag reducing agent is that the at least one alcohol may be 1-hexanol. Still another feature of the drag reducing agent is that the at least one alcohol may be 1-heptanol. A further feature of the drag reducing agent is that the at least one alcohol may be n-octyl alcohol. Another feature of the drag reducing agent is that the at least one alcohol may be n-nonyl alcohol. An additional feature of the drag reducing agent is that the at least one alcohol may be 1-decanol.

In accordance with the invention the foregoing advantages have been achieved through the present process for reducing drag in a conduit, comprising: forming a drag reducing agent comprising an alcohol absorbed polyalphaolefin, wherein the alcohol absorbed polyalphaolefin is formed by contacting an alpha olefin monomer with at least one catalyst in a reactant mixture, polymerizing the alpha olefin monomer, wherein during the polymerization at least a portion of the alpha olefin monomer polymerize in the reactant mixture to provide an ultra-high molecular weight polyalphaolefin having a polyalphaolefin weight, and contacting the ultra-high molecular weight polyalphaolefin with at least one water insoluble alcohol to form an alcohol absorbed polyalphaolefin having an alcohol absorbed polyalphaolefin weight that is at least 0.5% greater than the polyalphaolefin weight; and introducing the alcohol absorbed polyalphaolefin into the conduit.

DETAILED DESCRIPTION OF THE INVENTION

The following detailed description refers to certain details and specific aspects of the invention, including specific embodiments and examples of the invention. Also, for purposes of better understanding the invention, certain terms will now be explained and defined. It is to be understood that the invention is not limited or restricted to the specific examples and embodiments described below, which are included to assist a person skilled in the art in practicing the invention. On the contrary, it is intended to cover all alternatives, modifications, and equivalents, as may be included within the spirit and scope of the invention as defined by the appended claims.

The term "drag reducing agent" (DRA) as used herein refers to a composition that includes at least the formed polyalphaolefin polymer. The term "polyalphaolefin" refers to the polymer material formed by the polymerization of alpha olefin monomers, and is broadly construed to include not only the polymer in its final form, but also any intermediate polymers being formed, sometimes referred to as "oligomers." Preferably, the polyalphaolefin polymer is amorphous, i.e., the polyalphaolefin has no crystalline structures, or habits, existing in a single phase with substantially no solid particles, and has an ultra-high molecular weight and inherent viscosity of 10 dL/g or greater. The polyalphaolefin also includes a polyalphaolefin weight that can be measured in grams, kilograms, pounds or ounces.

"Ultra-high molecular weight," means a molecular weight corresponding to an inherent viscosity of at least about 10 dL/g. Because of the extremely high molecular weight of the DRA polymer, it is difficult to reliably and accurately measure the actual molecular weight, but inherent viscosity provides a useful approximation of molecular weight. "Inherent viscosity" is measured using a Cannon-Ubbelohde four bulb shear dilution viscometer (0.1 g polyalphaolefin/100 ml toluene at 25° C.). Inherent viscosities are calculated for each of the four bulbs. The viscosities are then plotted as a function of shear rate. The plot is then used to determine the inherent viscosity at a shear rate of 300 sec-1. It is contemplated that an inherent viscosity of 10 dL/g corresponds roughly to a molecular weight of at least about 10 or 15 million. Preferably, the ultra-high molecular weight polyalphaolefins have molecular weights even higher, e.g., greater than 25 million. The polyalphaolefins formed preferably have a narrow molecular weight distribution. Because different assumptions about the properties of the polyalphaolefin can yield different estimates of molecular weights, the inventors prefer using inherent viscosity to characterize the molecular weights of their drag reducing agents.

While the polyalphaolefin polymer may be formed using any method known to persons skilled in the art (e.g., using the methods disclosed in U.S. Pat. Nos. 3,692,676; 4,289,679; 4,358,572; 4,433,123; 4,493,903; 4,493,904; 5,244,937; 5,449,732; 5,504,131; 5,504,132; and 5,539,044, all of which are hereby incorporated by reference), the polyalphaolefin polymer is preferably made in accordance with the methods described in U.S. Pat. No. 6,015,779, which is hereby incorporated by reference. Generally, the polyalphaolefin polymer is formed by contacting alpha olefin monomers, e.g., alpha olefins monomers having 2 to 20 carbon atoms, with a catalyst in a reactant mixture. Homopolymers, copolymers and terpolymers may be used. Preferred alpha olefin monomers include ethylene, propylene, 1-butene, 4-methyl-1-pentene, 1-hexene, 1-octene, 1-decene, 1-dodecene and 1-tetradecene; conjugated or unconjugated dienes such as butadiene and 1,4-hexadiene; aromatic vinyls such as styrene; and cyclic olefins such as cyclobutene. Most preferably, the alpha olefin monomers are co-monomers of 1-hexene and 1-dodecene present in a 1:1 mole ratio; or co-monomers of 1-octene and 1-tetradecene present in a 1:1 mole ratio.

In one preferred embodiment, disclosed in U.S. Pat. No. 6,015,779, alpha olefin monomers are contacted with a catalyst and a co-catalyst system having at least one co-catalyst. While it is contemplated that any catalyst known to persons skilled in the art may be utilized, e.g., metallocene or Ziegler-Natta catalysts, preferred catalysts include transition metal catalysts such as those catalysts containing titanium trichloride, titanium tetrachloride or metallocene or combinations thereof. Preferably, the transition metal catalysts are non-metallocene. Titanium trichloride, which is most preferred, has been used for years in making drag reducing agents, and is preferably used in an amount ranging from at least about 100 to 1500 parts per million (ppm) based on the weight of all the components, i.e., the alpha olefins, co-catalysts, and catalysts supplied to the reactor.

Co-catalysts have also been used for years to form drag reducing agents. It is contemplated that any co-catalyst known to persons skilled in the art may be included with the catalyst; however, preferred co-catalysts includes one or more co-catalyst selected from the group consisting of alkylaluminoxanes, halohydrocarbons, diethylaluminum chloride ("DEAC") and dibutylaluminum chloride ("DIBAC"). As mentioned above, the process of forming the drag reducing agent may include no co-catalyst, one co-catalyst, or a plurality of co-catalysts.

The alpha olefin monomers may be polymerized at a temperature at about or less than 25° C., and preferably, at about or less than 10° C., wherein during the polymerization, at least a portion of the alpha olefin monomers polymerize in the reactant mixture to provide a polyalphaolefin. Preferably, the alpha olefin monomers are polymerized at a temperature of about –5° C.

While it is to be understood that any polymerization method known to persons skilled in the art may be used to form the polyalphaolefin, e.g., through liquid polymerization, suspension polymerization, precipitation polymerization, or bulk polymerization, preferably, the polyalphaolefin is formed using bulk polymerization.

In some instances, the polyalphaolefin is cryoground as disclosed in U.S. Pat. Nos. 5,504,131; 5,504,132; and 5,539,044. Additionally, partitioning agents, also known as coating agents, may be, and preferably are, mixed with the polyalphaolefin. Partitioning agents historically have been known as compositions that help prohibit polyalphaolefin polymer particles from sticking together in large clumps, thereby facilitating the dispersion of the polyalphaolefin in the hydrocarbon in the conduit. The partitioning agents maybe added during polymerization and/or during cryogrinding of the polyalphaolefin into fine polymer particles. Partitioning agents are generally known to persons skilled in the art and also may be included in the reactant mixture or, alternatively, mixed with the polyalphaolefin after polymerization. Preferred partitioning agents are solid alpha olefin monomer partitioning agents having 30 to at least about 65 carbons. In one embodiment, an alpha olefin monomer partitioning agent, i.e., solid alpha olefin monomers having about 30 to about 65 carbon atoms, is mixed with the polymer prior to contacting the polyalphaolefin with the alcohol. It is to be understood, however, that partitioning agents may not be required because it is contemplated that the alcohol absorbed polyalphaolefin facilitates separation of the polyalphaolefin particles so that they do not stick together. It has been observed by the inventors that the "partitioning agents" do not absorb the water insoluble alcohol and do not prevent the polyalphaolefin from absorbing the water insoluble alcohol. Accordingly, the polyalphaolefin is not completely "coated" or encased by the "partitioning agent."

In the event that a partitioning agent is employed, the partitioning agent is preferably an alpha olefin monomer partitioning agent that is solid at ambient temperatures, i.e., at temperature at which polymerization occurs. In other words, the alpha olefin monomer partitioning agents have a melting point that is higher than the alpha olefin monomers that undergo polymerization. Therefore, in one embodiment in which the alpha olefin monomer partitioning agents are included in the reactant mixture, the alpha olefin monomer partitioning agents do not undergo polymerization.

Generally, alpha olefin monomer partitioning agents that are solid at ambient temperature are $C_{20}$ to $C_{65}$ alpha olefin monomers. However, it is contemplated that solid $C_2$ through $C_{19}$ alpha olefin monomers, as well as solid $C_{66}$ and greater alpha olefin monomers, may also be designed to be suitable partitioning agents of the present invention provided these alpha olefin monomers have a melting point that is higher than the temperature at which the polymerization of the alpha olefin monomers occurs.

In one embodiment, the alpha olefin monomer partitioning agents of the present invention are included in the reactant mixture. In this embodiment, the alpha olefin monomer partitioning agent is present in the reactant mixture in an amount ranging from at least about 10 to about 50 weight percent based upon the weight of all of the components, e.g., alpha olefin monomers, catalyst, co-catalyst(s), etc., of the reactant mixture. Preferably, the alpha olefin monomer partitioning agent is present in the reactant mixture at a concentration of at least about 25 weight percent.

After the polyalphaolefin is formed it is contacted, combined, or mixed, preferably under agitation, with at least one water insoluble alcohol to form an alcohol absorbed polyalphaolefin mixture having an alcohol absorbed polyalphaolefin weight that is greater than the polyalphaolefin weight. Alcohol absorbed polyalphaolefin weight is also referred to herein with respect to an increase in the polyalphaolefin weight that is caused by the absorption of at least one water insoluble alcohol.

Water insoluble alcohols are straight-chained alcohols that are substantially insoluble, or immiscible, in water. Substantially insoluble, or immiscible, in water is herein defined as having a solubility in water of less than 0.2% by weight of alcohol to water. Additionally, preferably, the water insoluble alcohol is substantially pure or neat, i.e, contains less than 0.25% of any additional liquid, gas, or solid. Preferred water insoluble alcohols include 1-pentanol, 1-hexanol, 1-heptanol, n-octyl alcohol, n-nonyl alcohol, and 1-decanol and are commercially available. It has been discovered that n-octyl alcohol provides a greater weight increase to the polyalphaolefin as compared to 1-hexanol. Therefore, it is contemplated that the higher water insoluble alcohols, e.g., n-nonyl alcohol, 1-decanol, and higher, will provide the greatest weight increase to the polyalphaolefin. These higher alcohols, however, are very expensive.

The polyalphaolefin is contacted, combined, or mixed, with the at least one water insoluble alcohol for a period of time, and at a temperature, sufficient to permit the polyalphaolefin to absorb the water insoluble alcohol such that the alcohol absorbed polyalphaolefin weight is at least 0.5% greater than the polyalphaolefin weight. It has been discovered that the polyalphaolefin is inherently limited as to how much water insoluble alcohol is capable of being absorb, however, the greater the absorption of the water insoluble alcohol, the better the alcohol absorbed polyalphaolefin disperses and dissolves in the hydrocarbon and in the conduit, thus, improved drag reduction is realized. Furthermore, it is contemplated that by adjusting the amount of absorption of the water insoluble alcohol by the polyalphaolefin, customized drag reducing agents may be formed that may include larger sized particles of polyalphaolefin so that the drag reducing capabilities will be available along greater distances of the conduit from the drag reducing agent injection site. Therefore, these drag reducing agents may include a broad range of polyalphaolefin particle sizes such that the smaller sized polyalphaolefin particles disperse and dissolve within in the hydrocarbon close to the injection point into the conduit and the larger sized polyalphaolefin particles disperse and dissolve within in the hydrocarbon further away from the injection point into the conduit. Accordingly, it is contemplated that less injection equipment will be required along certain portions of the conduit or pipeline, thereby reducing costs associated with the use of drag reducing agents.

It is also contemplated that these customized drag reducing agents may also be formed to facilitate quicker dissolution of the polyalphaolefin in heavy crude oil pipelines, thereby realizing drag reduction quicker in those pipeline. Therefore, while it is to be understood that the increase in weight of the polyalphaolefin by absorption of the water insoluble alcohol may vary depending upon application, hydrocarbon type, and conduit size, among other factors, preferably, the alcohol absorbed polyalphaolefin weight is at least 0.5% greater than the polyalphaolefin weight, and more preferably, at least 1% to about 50% greater than the polyalphaolefin weight.

While the polyalphaolefin may be contacted, combined, or mixed, with the water insoluble alcohol at various temperatures and for various periods of time to provide the desired or necessary alcohol absorbed polyalphaolefin weight, preferably, the polyalphaolefin is contacted, combined, or mixed, with the water insoluble alcohol at room temperature, e.g., approximately 20° C., or higher and for a period of time of at least 1 day. It is noted that it has been discovered that an increase in temperature from room temperature to 40° C., and an increase in the period of time from 1 day to as many as 40 days, show an increase in the amount of absorption of the water insoluble alcohol by the polyalphaolefin. Therefore, it is contemplated that temperature and the length of time the polyalphaolefin and the water insoluble alcohol are combined, contacted, or mixed together may also be used to create customized drag reducing agents as discussed above with respect to the increase in the polyalphaolefin weight caused by the absorption of the one water insoluble alcohol.

In one example of the invention, the polyalphaolefin was combined with the water insoluble alcohol (1-hexanol) at room temperature for a period 40 days resulting in an increase in the weight of the polyalphaolefin of approximately 11%. In other example of the invention, the polyalphaolefin was combined with the water insoluble alcohol (1-hexanol) at 40° C. for a period of 5 days resulting in an increase in the weight of the polyalphaolefin of approximately 17.5%. In still another example of the invention, the polyalphaolefin was combined with the water insoluble alcohol (n-octyl alcohol) at room temperature for a period of 19 days resulting in an increase in the weight of the polyalphaolefin of approximately 38%.

In all of the examples described herein, the polyalphaolefin was formed by bulk polymerization by the processes and using the reactants disclosed in U.S. Pat. No. 6,015,779 as discussed above. Four samples of solid pieces of polyalphaolefin each having nearly identical sizes ranging from 0.5 to 1.5 grams were placed in a four separate containers. One container included 1-hexanol; a second container included n-octyl alcohol; a third container included water; and a fourth container included ethyl alcohol (a water soluble alcohol). Each sample was placed at room temperature for 40 days. Each day, the polyalphaolefin sample was removed from the container and weighed. While the weight of the samples contained in the 1-hexanol and the n-octyl alcohol increased, the weight of the sample contained in the water remained substantially constant and the weight of the sample in the ethyl alcohol decreased. Further, drag reduction testing of the four samples described above has shown that polyalphaolefin samples in 1-hexanol and n-octyl alcohol provides increased dissolution of the polyalphaolefin in the hydrocarbon and, thus, better drag reduction, as compared to the samples in water and ethyl alcohol.

After the alcohol absorbed polyalphaolefin is formed, it may then be used as a drag reducing agent. Preferably, the alcohol absorbed polyalphaolefin is combined or mixed with additional components or liquid vehicles known in the art to form a drag reducing agent slurry. In one preferred example of the invention, the alcohol absorbed polyalphaolefin is formed using 1-octyl alcohol and then is combined with 1-hexanol to form a drag reducing agent slurry.

Drag reducing agents comprising an alcohol absorbed polyalphaolefin may be used to reduce drag in a conduit by adding the drag reducing agent to a conduit containing a hydrocarbon. Additionally, the drag reducing agent comprising an alcohol absorbed polyalphaolefin may also be further processed by any method known to those skilled in the art to be utilized to reduce drag in a conduit.

It is to be understood that the invention is not limited to the exact details of construction, operation, exact materials, or embodiments shown and described, as obvious modifications and equivalents will be apparent to one skilled in the art. Accordingly, the invention is therefore to be limited only by the scope of the appended claims.

What is claimed is:

1. A process for forming a drag reducing agent, the process comprising:
    contacting an alpha olefin monomer with at least one catalyst in a reactant mixture;
    polymerizing the alpha olefin monomer, wherein during the polymerization at least a portion of the alpha olefin monomer polymerize in the reactant mixture to provide an ultra-high molecular weight polyalphaolefin;
    cryogrinding the ultra-high molecular weight polyalphaolefin to form a cryoground polyalphaolefin having a cryoground polyalphaolefin weight; and
    contacting the cryoground polyalphaolefin with at least one water insoluble alcohol for a period of time and at a temperature sufficient to form an alcohol absorbed polyalphaolefin having an alcohol absorbed polyalphaolefin weight that is at least 0.5% greater than the polyalphaolefin weight.

2. The process of claim 1, wherein the at least one alcohol is selected from the group consisting of 1-pentanol, 1-hexanol, 1-heptanol, n-octyl alcohol, n-nonyl alcohol, 1-decanol, and mixtures thereof.

3. The process of claim 2, wherein the period of time is at least one hour and the temperature is at least 10° C.

4. The process of claim 2, wherein the period of time is at least seven days and the temperature is at least 20° C.

5. The process of claim 2, wherein the period of time is at least twenty eight days and the temperature is at least 20° C.

6. The process of claim 1, wherein the at least one alcohol is 1-pentanol.

7. The process of claim 1, wherein the at least one alcohol is 1-hexanol.

8. The process of claim 1, wherein the at least one alcohol is 1-heptanol.

9. The process of claim 1, wherein the at least one alcohol is n-octyl alcohol.

10. The process of claim 1, wherein the at least one alcohol is n-nonyl alcohol.

11. The process of claim 1, wherein the at least one alcohol is 1-decanol.

12. A drag reducing agent comprising an alcohol absorbed polyalphaolefin, the alcohol absorbed polyalphaolefin including a cryoground polyalphaolefin having a cryoground polyalphaolefin weight and a water insoluble alcohol, wherein the alcohol absorbed polyalphaolefin includes an alcohol absorbed polyalphaolefin weight that is at least 0.5% greater than the cryoground polyalphaolefin weight.

13. The drag reducing agent of claim 12, wherein the at least one alcohol is selected from the group consisting of 1-pentanol, 1-hexanol, 1-heptanol, n-octyl alcohol, n-nonyl alcohol, 1-decanol, and mixtures thereof.

14. The drag reducing agent of claim 12, wherein the at least one alcohol is 1-pentanol.

15. The drag reducing agent of claim 12, wherein the at least one alcohol is 1-hexanol.

16. The drag reducing agent of claim 12, wherein the at least one alcohol is 1-heptanol.

17. The drag reducing agent of claim 12, wherein the at least one alcohol is n-octyl alcohol.

18. The drag reducing agent of claim 12, wherein the at least one alcohol is n-nonyl alcohol.

19. The drag reducing agent of claim 12, wherein the at least one alcohol is 1-decanol.

20. A process for reducing drag in a conduit, comprising:
    forming a drag reducing agent comprising an alcohol absorbed polyalphaolefin, wherein the alcohol absorbed polyalphaolefin is formed by
        contacting an alpha olefin monomer with at least one catalyst in a reactant mixture,
        polymerizing the alpha olefin monomer, wherein during the polymerization at least a portion of the alpha olefin monomer polymerize in the reactant mixture to provide an ultra-high molecular weight polyalphaolefin,
        cryogrinding the ultra-high molecular weight polyalphaolefin to form a cryoground polyalphaolefin having a cryoground polyalphaolefin weight, and
        contacting the cryoground polyalphaolefin with at least one water insoluble alcohol to form an alcohol absorbed polyalphaolefin having an alcohol absorbed polyalphaolefin weight that is at least 0.5% greater than the cryoground polyalphaolefin weight; and
    introducing the alcohol absorbed polyalphaolefin into the conduit.

* * * * *